Patented Nov. 25, 1941

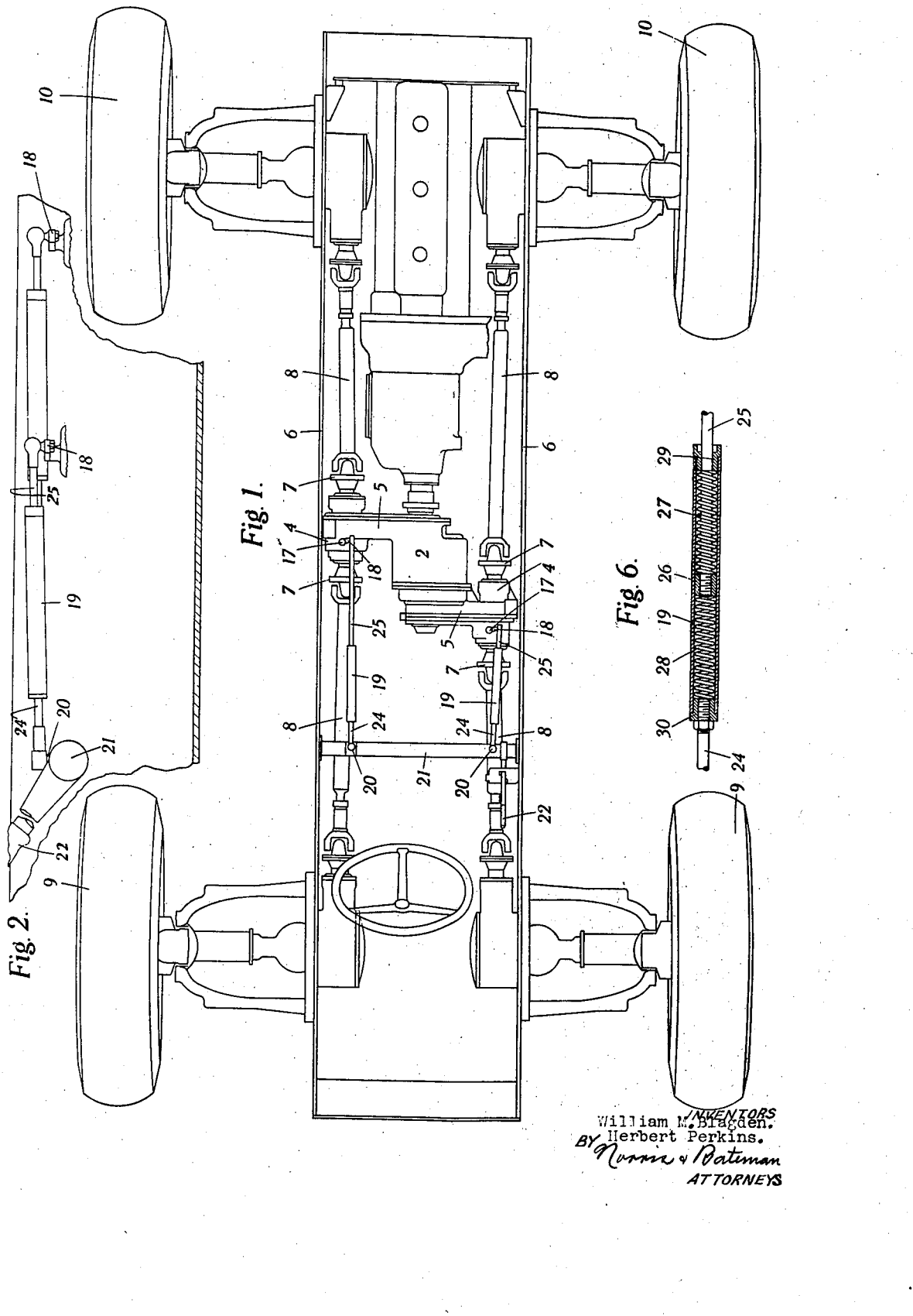

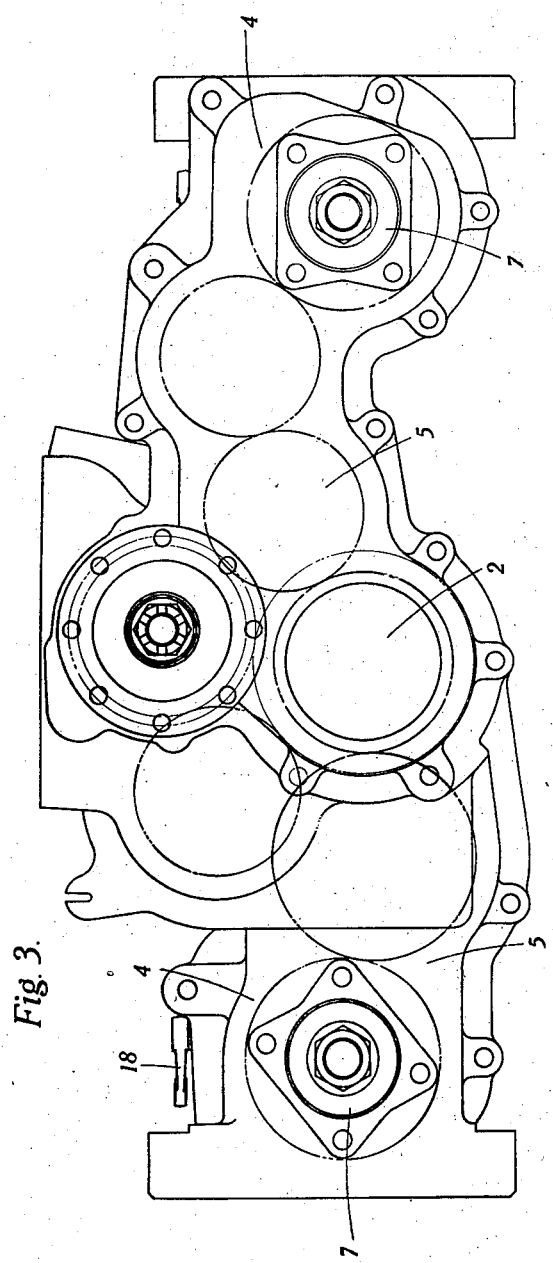

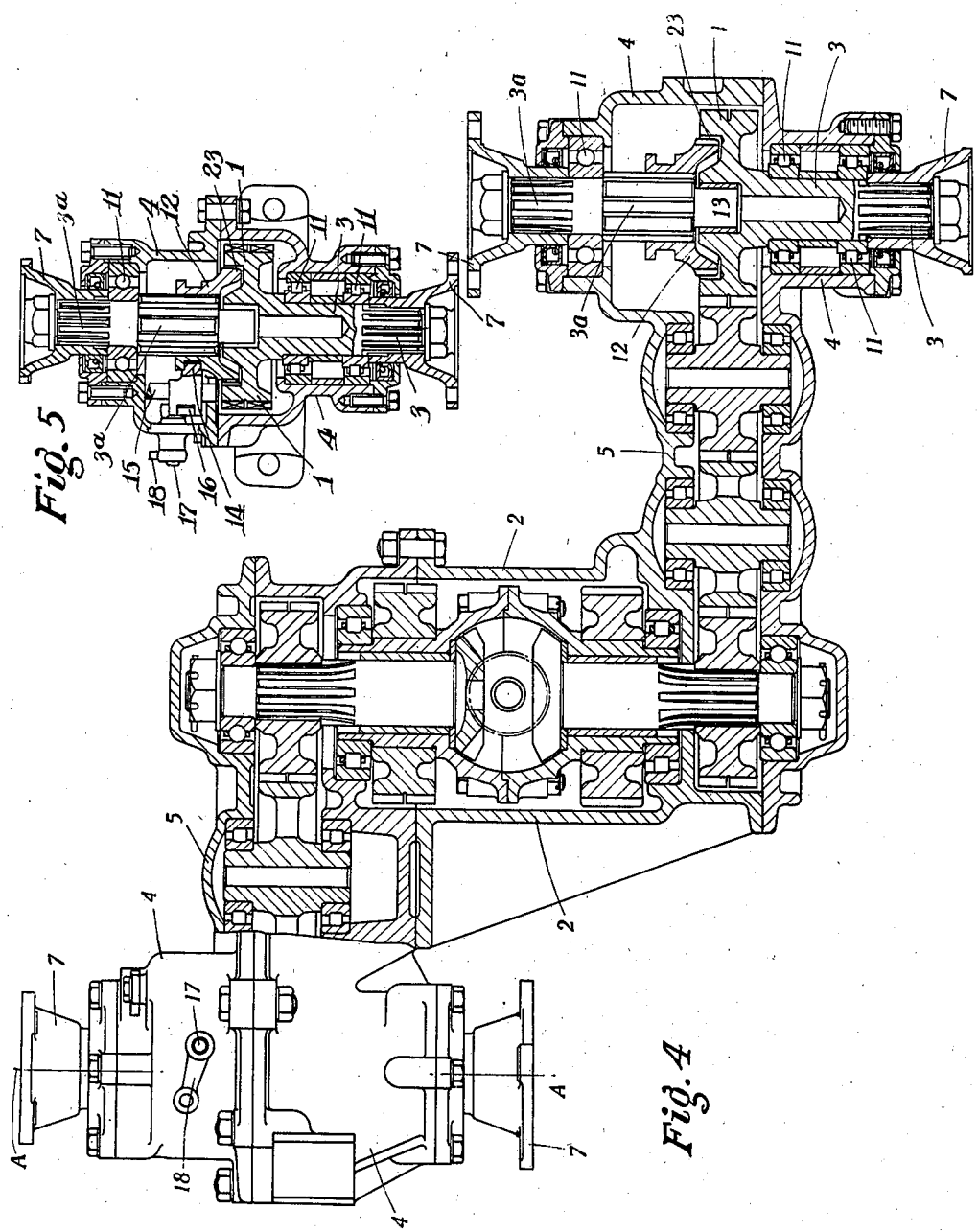

2,264,235

UNITED STATES PATENT OFFICE 2,264,235

TRANSMISSION MECHANISM FOR MOTOR VEHICLES

William Martin Blagden, Farnborough, and Herbert Perkins, Solihull, England, assignors to The Birmingham Small Arms Company Limited, Birmingham, England, a British company Application December 6, 1940, Serial No. 368,948 In Great Britain December 8, 1939

5 Claims. (Cl. 180—49)

This invention relates to transmission mechanism for motor vehicles of the kind in which the four wheels of the vehicle are driven by means of a central differential and transfer unit such as described and claimed in U. S. Patent No. 2,219,249 granted October 22, 1940, wherein a differential reverse and transfer gearing are coupled direct to the main gear box of the vehicle and so controlled as to enable the front and/or rear wheels to be driven in either direction.

In the aforesaid arrangement the central differential splits the drive between the off-side and near-side of the vehicle, while the off-side front and rear wheels are positively coupled by a drive which is geared to one side of the central differential. The near-side front and rear wheels are also positively coupled by a drive which is geared to the other side of the central differential.

In transmission mechanism such as previously described the direct coupling of the drive of the front and rear wheels of the vehicle entails slip between the said wheels and the ground under conditions where the steering of the front wheels without steering of the rear wheels, or vice versa, causes one wheel to travel in the path of a circle of larger radius than the other wheel. This condition of slip, imposes a drag load on the wheels when operating on hard roads which may react on the steering of the vehicle and result in difficulty in operating the steering mechanism, and also increases the rate of tyre wear.

The object of the present invention is to provide means for uncoupling the drive of the front wheels under certain conditions of operation so that the rear wheels only are positively driven by the central differential and transfer unit, thus relieving the front wheels from the action of the drive of the rear wheels, thereby facilitating the steering of the vehicle and also reducing the rate of tyre wear.

The present invention comprises the provision and use of means under manual control of the driver whereby the drive of the front wheels of the vehicle may be disengaged from the drive of the rear wheels, and wherein said manual control also serves to re-engage their drive.

In order that the invention may be completely understood, an embodiment thereof will now be described by way of example with reference to the accompanying drawings, in which:

Figure 1 is a skeleton plan view of a four-wheeled vehicle embodying a transmission mechanism in accordance with the invention.

Figure 2 is a side elevation on an enlarged scale of the central part of Figure 1.

Figures 3 and 4 show respectively a front elevation and a sectional plan view on an enlarged scale of the transmission mechanism as shown diagrammatically in Figure 1.

Figure 5 is a cross sectional view taken on line A—A, Figure 4.

Figure 6 is a longitudinal section on an enlarged scale of the spring loaded link mechanism.

According to one convenient mode of carrying the invention into effect in transmission mechanism of the aforesaid kind, wherein the ultimate driven gears 1 of the differential and transfer unit 2 are fixed to or formed on output shafts 3 mounted in casings 4 formed on or fitted to the transverse extensions 5 of the main casing of the central differential and transfer unit 2, the said output shafts 3 being disposed longitudinally in relation to the longitudinal side members 6 of the frame of the vehicle and provided at each end with a coupling 7 for attachment to the propeller shafts 8 arranged to drive the front and the rear wheels 9 and 10, we provide an improved construction and arrangement of mechanism in which the said output shafts 3 are formed in two parts 3 and 3a disposed in longitudinal alignment, and mounted in bearings 11 in the casings 4 on the transverse extensions 5 of the differential casing, the ultimate driven gears 1 being mounted on the part 3 of said longitudinally divided output shaft which is coupled to the rear wheels 10 of the vehicle, while the part 3a of said output shafts which is coupled to the front wheels 9 is arranged to carry sliding dogs 12 and is conveniently supported at its inner end by a spigot bearing 13 in the ultimate driven gear 1 which is formed on or fitted to the other part 3 of said output shaft.

The aforesaid sliding dogs 12 which are slidably keyed to the front part 3a of the output shafts, are operated by sliding forks 14 carried on a shaft 15 mounted in the casing 4, as seen in Figure 5. If desired the said forks may be located on said shafts in one of two positions by a spring loaded ball engaging with detents formed in said shafts or by any other known convenient means. The sliding forks 14 are operated by means of levers 16 fixed to short vertically disposed shafts 17 mounted in the casing 4 of the unit, the said shafts 17 having mounted on their outer ends levers 18 connected by means of spring loaded links 19 to levers 20 keyed to a cross shaft 21 mounted transversely between the side members 6 of the chassis frame, the said cross shaft 21 having keyed thereon a lever 22 arranged and adapted for manual operation.

By manual operation of the aforesaid lever 22 the sliding dogs 12 can be moved into engagement with internal teeth 23 in the ultimate gears 1 on the part 3 of the divided output shaft coupled to the rear wheels 10, as seen in Figures 4 and 5, which operation couples together the two parts of the said output shaft, thereby driving both front and rear wheels 9 and 10 of the vehicle. Alternatively, by sliding the forks 14 in the opposite direction by means of the manually operated lever 22, the dogs 12 are disengaged from the internal teeth 23 of the ultimate aforesaid gears 1, thus disconnecting the two parts of said output shafts, and thereby disconnecting the drive from said gears to the front wheels 9 of the vehicle.

The aforesaid spring loaded links, as seen in Figure 6, comprise a rod 24 fixed in one end of a tubular member and a rod 25 slidably mounted in the other end of said tubular member and having fixed on its inner end an abutment 26 on the opposite sides of which react springs 27 and 28, the outer ends of said springs reacting on abutments 29 and 30 mounted in the outer ends of the aforesaid tubular member.

It will be readily understood that if the teeth of the sliding dogs 12 are not in suitable relative positions to slide into the internal teeth 23 of the ultimate driven gears 1 when the manually operated lever 22 is actuated, the movement of said lever will be taken up in the spring loaded links 19 which will cause a spring load to be imposed upon the sliding dogs 12 through the aforesaid lever and fork actuating mechanism, which will cause said sliding dogs to slide into engagement with the internal teeth 23 of the driven gears 1 when suitable relative positions have respectively been obtained. Alternatively, if the sliding dogs 12 are already engaged with the internal teeth 23 in the driven gears 1, the opposite movement of the manually operated lever 22 will impose a spring load on the sliding dogs and will thus cause them to disengage as soon as any loading on the drive is sufficiently reduced.

Having thus described our invention, what we claim as new and desire to secure by Letters Patent is:

1. In a motor vehicle having a main frame having longitudinal side members, front and rear wheels, a main change speed gear box, parallel propeller shafts disposed longitudinally at opposite sides of the vehicle and connected to the front and rear wheels at the respective sides of the vehicle for driving them, a combined differential, reverse and transfer gearing mounted centrally between the longitudinal side members of the frame and comprising a driving shaft disposed longitudinally of the vehicle and coupled direct to the output shaft of the main gear box, forward and reverse pinions mounted on said driving shaft, differential gearing including differential gear shafts disposed parallel to said driving shaft, means for selectively coupling said pinions to said differential gear shafts, gearing disposed transversely of the vehicle and connecting said differential gear shafts to the respective longitudinal propeller shafts for driving them, and means under manual control whereby the drive of the front wheels of the vehicle may be disengaged and re-engaged at will from the drive of the rear wheels.

2. A motor vehicle according to claim 1, wherein said differential, reverse and transfer gearing embodies means for disengaging and re-engaging the drive to the front and rear wheels in either direction.

3. A motor vehicle according to claim 1 wherein said differential, reverse and transfer gearing comprises output shafts formed in two parts disposed in longitudinal alignment and means under manual control for coupling or uncoupling said parts.

4. A motor vehicle according to claim 1 wherein said differential, reverse and transfer gearing comprises output shafts formed in two parts disposed in longitudinal alignment, a gear wheel fixed or formed on one of said parts and a clutch member slidably mounted on the other said part, clutch dogs formed on said clutch member engaging with clutch teeth formed on said gear wheel.

5. A motor vehicle according to claim 1, wherein said differential, reverse and transfer gearing comprises output shafts formed in two parts disposed in longitudinal alignment, a gear wheel fixed or formed on one of said parts and a clutch member slidably mounted on the other said part, clutch dogs formed on said clutch member engaging with clutch teeth formed on said gear wheel, and wherein said slidable clutch member is actuated under manual control by lever and link mechanism embodying spring loaded links.

WILLIAM MARTIN BLAGDEN.
HERBERT PERKINS.